US010499256B2

(12) United States Patent
Roos

(10) Patent No.: US 10,499,256 B2
(45) Date of Patent: Dec. 3, 2019

(54) APPROACHES FOR INCREASING COVERAGE-AREA OF SPOT BEAMS IN A WIRELESS COMMUNICATIONS SYSTEM

(71) Applicant: Hughes Network Systems, LLC, Germantown, MD (US)

(72) Inventor: Dave Roos, Boyds, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/859,376

(22) Filed: Dec. 30, 2017

(65) Prior Publication Data
US 2019/0208426 A1    Jul. 4, 2019

(51) Int. Cl.
*H04W 16/28* (2009.01)
*H04W 84/06* (2009.01)

(52) U.S. Cl.
CPC ............ *H04W 16/28* (2013.01); *H04W 84/06* (2013.01)

(58) Field of Classification Search
CPC ..... H04W 84/06; H04W 64/00; H04W 16/28; H04W 36/165; H04W 72/042; H04W 48/04
USPC ......... 455/12.1, 427, 13.1, 429, 3.02, 550.1, 455/3.01, 431; 342/354, 372, 352, 368; 370/316, 321, 310
See application file for complete search history.

(56) References Cited

U.S. PATENT DOCUMENTS

| | | | | |
|---|---|---|---|---|
| 5,612,701 A | * | 3/1997 | Diekelman | H04B 7/2041 342/352 |
| 5,697,050 A | * | 12/1997 | Wiedeman | B64G 1/24 342/354 |
| 6,448,940 B1 | * | 9/2002 | Chiang | H01Q 1/084 244/165 |
| 6,496,682 B2 | | 12/2002 | Butte et al. | |
| 6,836,658 B1 | * | 12/2004 | Sharon | H04B 7/18523 370/323 |

(Continued)

FOREIGN PATENT DOCUMENTS

WO    WO2017124004 A1    7/2017

OTHER PUBLICATIONS

USPTO, "International Search Report and Written Opinion", PCT/US2018/067429, dated Mar. 28, 2019.

*Primary Examiner* — Keith Ferguson
(74) *Attorney, Agent, or Firm* — Potomac Technology Law, LLC

(57) ABSTRACT

Approaches for wireless telecommunications systems (e.g., satellite systems), that employ beams that move in a pattern to increase the coverage area of the beams, are provided. A wireless telecommunications apparatus comprises an antenna configured to generate communications beams for providing data communications services over a respective coverage area on the surface of the Earth. The apparatus further comprises a processor configured to control each of at least one of the communications beams to move its coverage area in a respective pattern over a respective period of time. Further, a method comprises generating, via a wireless telecommunications apparatus, communications beams, wherein each beam provides data communications services over a respective coverage area on the surface of the Earth, and controlling each of at least one of the communications beams to move its coverage area in a respective pattern of movement over a respective period of time.

20 Claims, 11 Drawing Sheets

(56) References Cited

U.S. PATENT DOCUMENTS

| | | | |
|---|---|---|---|
| 7,068,974 B1* | 6/2006 | Linsky | H04B 7/18515 |
| | | | 455/12.1 |
| 8,767,615 B2 | 7/2014 | Chang | |
| 9,973,268 B1* | 5/2018 | Husted | H04B 7/18534 |
| 2003/0222816 A1* | 12/2003 | Liu | H01Q 3/005 |
| | | | 342/359 |
| 2004/0222932 A1* | 11/2004 | Peebles | H01Q 1/288 |
| | | | 343/781 P |
| 2011/0268158 A1 | 11/2011 | Miller et al. | |
| 2017/0215176 A1 | 7/2017 | Chan | |
| 2017/0288769 A1 | 10/2017 | Miller et al. | |
| 2019/0007129 A1* | 1/2019 | Vargas | H04B 17/382 |

\* cited by examiner

APPROACHES FOR INCREASING COVERAGE-AREA OF SPOT BEAMS IN A WIRELESS COMMUNICATIONS SYSTEM

BACKGROUND

Broadband technologies are taking a predominant role in the emerging information society, and, in particular, broadband satellite communication systems are being broadly employed to respond to the growing requirements of the information society. More specifically, based on global access and broadcasting capabilities, satellite communication systems are well suited to provide broadband services to remote locations and highly mobile users (e.g., broadband services provided to rural areas and to ships, aircraft, trains, etc.), as well as to major metropolitan areas of high population density and high broadband demands. Accordingly, the overall demand for broadband capacity continues to increase exponentially. Bandwidth availability limitations of satellite systems, however, continues to be a predominant issue in the continued growth of this communications technology.

In order to satisfy the growth in demand for high availability broadband capacity, broadband satellite communications systems that deploy high throughput satellites are becoming more prevalent. High throughput satellite (HTS) is a classification for a communications satellite that provides upwards of more than 20 times the total throughput of a classic FSS geostationary communications satellite (e.g., throughputs of more than 100 Gbit/sec of capacity are currently being deployed, which amounts to more than 100 times the capacity of a conventional Ku-band satellite). Moreover, these satellites typically utilize the same amount of allocated orbital spectrum, and thus significantly reducing cost-per-bit. The significant increase in capacity of an HTS system is achieved by employing wideband satellite technology, including an increased number of beams of a given satellite to increase the available bandwidth and thereby increase the respective capacity of the satellite.

Multi-beam communications satellites (e.g., spot beam satellites) are designed such that a given geographic coverage area is serviced by a pattern of beams. With such multi-beam satellites, in order to avoid or minimize inter-beam interference, certain frequency reuse principles must be applied to the bream patterns of the antenna design. One of the primary guidelines for the beam pattern is that a frequency and polarization combination of one beam cannot be "reused" within a certain distance from another beam of the same frequency and polarization combination. The distance between beams is generally specified as the distance between beam centers of two beams of a same color (two beams of the same frequency band and polarization), where the distance is quantified in terms of the radius r of the beams. If the minimum distance requirements are not followed with regard to two such beams, then the beams will cause unacceptable levels of interference between them. The beam pattern design is commonly referred to as a frequency reuse pattern, where each polarization/frequency pair is diagrammatically reflected by a beam color (or pattern in the case of the black and white figures included herein). In typical systems, a reuse of four means that a set of four adjacent beams will have disjoint frequency and polarization assignments such that none of the beams of each set interfere with each other. In other words, adjacent sets of four beams separate the beams sharing a common frequency and polarization such that (even though they are reusing the same frequency and polarization assignments) the beams of one set will not excessively interfere with the respective beams of an adjacent set.

For example, FIG. 1A illustrates a typical 4-beam reuse pattern of a single satellite 110, where, for example, the striped pattern of the cell 101 on the ground reflects a right-hand polarization of a first frequency or frequency band, the dot pattern of the cell 103 reflects a left-hand polarization of the same frequency band as that of 101, the checkered pattern of the cell 105 reflects a right-hand polarization of a second frequency or frequency band, and the brick pattern of the cell 107 reflects a left-hand polarization of the same frequency band as that of the cell 105. In such a four-color reuse pattern, the distance between the beam centers of two beams of the same color are $2\sqrt{3}*r$ apart, where r is the center-to-vertex radius of the hexagonal beam. As a further example, FIG. 1B illustrates a typical 3-color reuse pattern, where (similar to the 4-beam reuse pattern of FIG. 1A) each of the ground cell patterns 111, 113, 115 reflects a particular beam frequency/polarization assignment. In such a three-color reuse pattern, the distance between the beam centers of two beams of the same color are $3*r$ apart, again where r is the center-to-vertex radius of the hexagonal beam. Accordingly, as illustrated by these Figures, each group of four or three particular polarization/frequency beams is geographically arranged such that a beam of a particular polarization/frequency is not adjacent to any beam of the same polarization/frequency (where such beam pairs of a same polarization/frequency are separated by a required minimum distance).

Accordingly, with such multibeam satellites, a high level frequency reuse and spot beam technology is employed to enable frequency reuse across multiple narrowly focused spot beams (usually in the order of 100's of kilometers). In principal, increasing the number of beams, and the number of times a frequency can be reused for different beams, increases the achievable bandwidth (subject to satellite antenna gain-to-noise-temperature (G/T), equivalent isotropic radiated power (EIRP), and other such transmission and power limitations of the satellite). Further, the narrower that each beam can be made, further capacity gains can be achieved (e.g., because of better G/T and EIRP achieved by a narrower beam), and more beams can be formed over a geographical area, which also improves capacity density over that area. In order to form narrower beams, however, the antenna size must be increased—the size of a spot beam is determined primarily by the size of the antenna on the satellite—the larger the antenna, the smaller the spot beam. Further, as would be recognized by one of skill in the art, in order to achieve reasonably acceptable RF performance, the number of beams and the reuse pattern employed will impose certain payload design requirements, such as the number of antennae and the size of each antenna required to implement the desired beam pattern.

In addition to antenna size, implementation of such an increased number of narrow beams increases the amount and complexity of the required hardware to generate and operate the increased number of narrower beams. Accordingly, the desired number of beams, reuse pattern and total capacity will contribute to payload size, weight and power requirements, which in turn will drive up the satellite manufacturing time and costs, as well as the associated launch costs. Moreover, satellite size, weight and power limitations begin to limit the extent to which the beam width can be decreased and the beam count can be increased (e.g., based on of limitations in manufacturing technologies and efficiency, size and weight/mass limitations of launch vehicles, power and thermal limitations, cost/bit for the increased capacity and similar business/cost considerations, etc.). Accordingly, while current technology enables the implementation of relatively narrow beams (e.g., beams of ¼ degree in width), there is a limit on the number of such beams that can be implemented in a single satellite.

In order to maximize capacity over a given area, a satellite generally will use all of the available spectrum for each group of beams represented by the reuse colors. For example, if 1000 MHz of spectrum (in both polarizations—right-hand polarization (RHP) and left-hand polarization (LHP)) is available for a particular system, the system theoretically has 2000 MHz of available spectrum for each beam group. With reference to the 4-pattern reuse system of FIG. 1A, for example, each beam represented by the pattern 101 may comprise a RHP of the frequency band 18.3-18.8 GHz, each beam represented by the pattern 103 may comprise a LHP of the frequency band 18.3-18.8 GHz, each beam represented by the pattern 105 may comprise a RHP of the frequency band 19.7-20.2 GHz, and each beam represented by the pattern 107 may comprise a LHP of the frequency band 19.7-20.2 GHz. Each beam would thereby comprise 500 MHz of spectrum or bandwidth, for a total available capacity of 2,000 MHz within each 4-beam group. The reuse pattern can be repeated as many times as desired, up to a maximum desired coverage region, as limited by applicable physical constraints, such as total power and mass limits of the overall satellite payload. The total system bandwidth is then the sum of the individual bandwidths of all the beams.

In practice, however, the distribution of users and associated capacity demand within the cell coverage area is non-uniform, which drives the goal of a satellite system design to provide a corresponding non-uniform distribution of capacity density to satisfy the respective demand. Accordingly, some satellite system designs have attempted to solve capacity density requirements by deploying such satellite technologies as steerable beams. FIG. 1C illustrates the four pattern reuse plan of FIG. 1A, where the beams 1, 2, 3, 4 represent the respective cell patterns 101, 103, 105, 107 on the ground, and the beam pattern has been overlaid on a map of the Northeastern United States. As further illustrated in FIG. 1C, in order to provide higher capacity density to the New York/Long Island, Southern Connecticut and Boston areas, certain of the beams have been steered to double the capacity over these regions (e.g., the 3 beam 121 has been moved to the cell 122, the 1 beam 123 has been moved to the cell 124, the 3 beam 125 has been moved to the cell 126, and the 2 beam 127 has been moved to the cell 128). Accordingly, the capacity density has been adjusted to double the spectrum/capacity delivered to the cells 122, 124, 126, 128. This capacity density adjustment, however, has been achieved at the expense of the capacity delivered to the cells 121, 123, 125, 127—as spectrum cannot be provided to these cells without violating the adjacent cell polarization/frequency requirements.

An alternative design may provide for a higher per-beam spectrum allocation. In view of such constraints as satellite size, weight and power, however, such a design would limit the total number of beams available at the higher spectrum allocation. Further, providing for such high capacity beams also significantly increases satellite complexity. Accordingly, with this design, there may not be enough user beams to cover the contiguous United States, and thus the capacity would have to be provided to the higher density population areas at the expense of having no capacity provided to the lower density population areas (e.g., providing user beams over only the Eastern and Western coasts of the United States. Accordingly, again, the desired capacity density allocation is achieved at the expense of being unable to provide capacity to certain geographic regions.

What is needed, therefore, are approaches for wireless telecommunications systems that provide for spot beams of increased capacity over a respective geographic area without sacrificing capacity in adjacent beams and without overly increasing satellite size, weight, power and complexity relative to respective constraints.

BRIEF SUMMARY

The present invention advantageously addresses the foregoing requirements and needs, as well as others, by providing approaches for increasing the coverage area of spot beams of a wireless telecommunications system by controlling the spot beams to nutate or move in a pattern about an origin, central point or other reference point to increase the coverage area of the beams.

In accordance with example embodiments of the present invention, a wireless telecommunications apparatus, for providing data communications services via one or more communications beams that each provides the data communications services over a respective coverage area on the surface of the Earth, is provided. The wireless telecommunications apparatus comprises an antenna configured to generate the one or more communications beams. The wireless telecommunications apparatus further comprises a processor configured to control each of at least one of the one or more communications beams to move its coverage area in a respective pattern of movement over a respective period of time.

In accordance with further example embodiments of the present invention, a method for providing data communications services via one or more communications beams that each provides the data communications services over a respective coverage area on the surface of the Earth, is provided. The method comprises generating, via a wireless telecommunications apparatus, one or more communications beams, wherein each of the one or more communications beams provides data communications services over a respective coverage area on the surface of the Earth. The method further comprises controlling each of at least one of the one or more communications beams to move its coverage area in a respective pattern of movement over a respective period of time.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example, and not by way of limitation, in the figures of the accompanying drawings, in which like reference numerals refer to similar elements, and in which.

DETAILED DESCRIPTION

Approaches for increasing the coverage area of spot beams of a wireless telecommunications system (such as a satellite communications system) by controlling the spot beams to nutate or move in a pattern about an origin, central point or other reference point to increase the coverage area of the beams, are provided.

Figure 2:
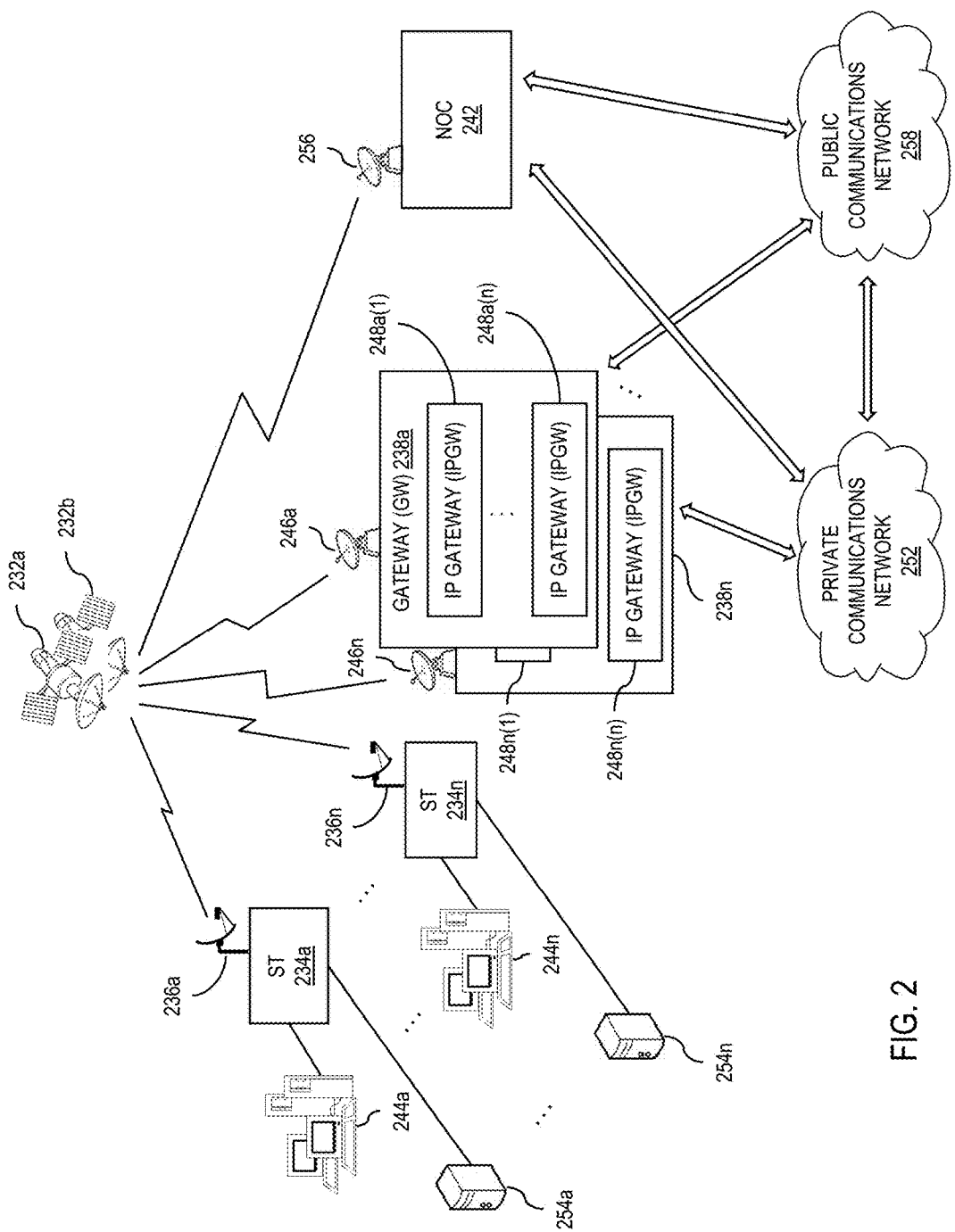
FIG. 2 illustrates an example satellite communications system capable of providing approaches for a satellite communications system that employs spot beams of increased coverage areas, in accordance with example embodiments of the present invention.

FIG. 2 illustrates an example satellite communications system capable of providing approaches for a satellite communications system that employs spot beams of increased coverage areas, in accordance with example embodiments of the present invention. The satellite communications system includes one or more satellites (of which two are shown in the Figure—satellites 232a and 232b) that support communications among multiple satellite terminals (STs) 234a-234n, a number of gateways (GWs) 238a-238n, and a network operations center (NOC) 242. The STs, GWs and NOC transmit and receive signals via the antennas 236a-236n, 246a-246n, and 256, respectively. According to different embodiments, the NOC 242 may reside at a separate site reachable via a separate satellite channel or may reside within a GW site. The NOC 242 performs the management plane functions of the system 230, while the GWs 238a-238n perform the data plane functions of the system 230. For example, the NOC 242 performs such functions as network management and configuration, software downloads (e.g., to the STs 234a-234n), status monitoring, statistics functions (e.g., collection, aggregation and reporting), security functions (e.g., key generation, management and distribution), ST registration and authentication, and GW diversity management. The NOC 242 communicates with each GW via the satellite 232, or via a secure private communications network 252 (e.g., an IPsec tunnel over a dedicated link or a virtual private network (VPN) or IPsec tunnel through a public network, such as the Internet). It should be noted that, according to one example embodiment, the traffic classification approaches of embodiments of the present invention address classification of data traffic flowing through an aggregation point or node. Additionally, each GW and the NOC have connectivity to one or more public communications networks, such as the Internet or a PSTN.

According to a further example embodiment, each of the GWs 238a-238n include one or more IP gateways (IP-GWs)—whereby the data plane functions are divided between a GW and its respective IPGWs. For example, GW 238a includes IPGWs 248a(1)-248a(n) and GW 238n includes IPGWs 248n(1)-248n(n). A GW may perform such functions as link layer and physical layer outroute coding and modulation (e.g., DVB-S2 adaptive coding and modulation), link layer and physical layer inroute handling (e.g., IPOS), inroute bandwidth allocation and load balancing, outroute prioritization, web acceleration and HTTP compression, flow control, encryption, redundancy switchovers, and traffic restriction policy enforcement. Here, the terminology "inroute" (or return link) refers to a data communications link from an ST to a respective GW over a respective satellite, and the term "outroute" (or forward link) refers to a link from a GW to one or more STs over a respective satellite. An inroute manager or inroute group manager (IGM) (not shown) may be located at each of the gateways. The IGM may be configured to control the bandwidth allocations to the remote terminals (e.g., on an inroute or inroute group basis), and to correspondingly control and administer the bandwidth allocation approaches provided in accordance with the example embodiments of the present invention. Further, as would be appreciated, in certain embodiments, the IGM may be deployed in a distributed manner, with a main controller at the NOC 242, whereby the NOC may be configured to administer system-wide controls for such bandwidth allocation approaches, whereas the inroute-based controls would be administered for specific inroutes/inroute groups by the IGM at the respective gateway that controls such inroutes/inroute groups. Various other architectures may also be provided to meet respective different system design goals and requirements.

The IPGW may perform such functions as data compression, TCP performance enhancements (e.g., TCP performance enhancing proxies, such as TCP spoofing), quality of service functions (e.g., classification, prioritization, differentiation, random early detection (RED), TCP/UDP flow control), bandwidth usage policing, dynamic load balancing, and routing. Further, a GW and respective IPGW may be collocated with the NOC 242. The STs 234a-234n provide connectivity to one or more hosts 244a-244n and/or routers 254a-254n, respectively. The Satellite communications system may operate as a bent-pipe system, where the satellite essentially operates as a repeater or bent pipe. Alternatively, the system may employ a switching or processing satellite supporting mesh communications (point-to-point communications directly between, for example, the two STs 234*a* and 234*n*).

In a bent-pipe system of an example embodiment, the satellite 232 operates as a repeater or bent pipe, and communications to and from the STs 234*a*-234*n* are transmitted over the satellite 232 to and from respective IPGWs associated with particular STs. Further, in a spot beam system, any one spot beam operates as a bent-pipe to geographic region covered by the beam. For example, each spot beam operates as a bent pipe communications channel to and from the STs and/or IPGW(s) within the geographic region covered by the beam. Accordingly, signal transmissions to the satellite are either from an ST and destined for an associated gateway, or from a gateway and destined for an associated ST. According to one embodiment, several GWs/IPGWs are distributed across the geographic region covered by all spot beams of the satellite 232, where, in a beam in which a GW (and respective IPGWs) are located, only the one GW (and no STs) occupies that beam. Further, each IPGW may serve as an aggregation node for a multitude of remote nodes or STs. The total number of GWs/IPGWs, and the geographic distribution of the GWs/IPGWs, depends on a number of factors, such as the total capacity of the satellite dedicated to data traffic, geographic traffic loading of the system (e.g., based on population densities and the geographic distribution of the STs), locations of available terrestrial data centers (e.g., terrestrial data trunks for access to public and private dedicated networks). More specifically, for a data communication from ST 234*a* to a public communications network 258 (e.g., the Internet), the ST 234*a* is associated with an IPGW (e.g., IPGW 248*a*(1)—selected from a pool of IPGWs available to the ST 234*a*, such as IPGWs 248*a*(1)-248*a*(7)—where the pool of IPGWs is a suitable subset of the IPGWs 248*a*(1)-248*a*(n) located at the GW 238*a*). The data is first transmitted, via the satellite 232, from the ST 234*a* to associated IPGW 248*a*(1). The IPGW 248*a*(1) determines the destination as being the Internet 258. The IPGW then repackages the data (e.g., as a TCP/IP communication), and routes the data communication, via the terrestrial link 264, to the Internet 258.

While the following example embodiments comprise application of the concepts of the present invention to a single-beam or multi-beam satellite, the invention is not limited to only satellite applications. Instead, the concepts of the present invention are applicable to any wireless communications platform that provides data communications services via one or more discrete radio frequency communications beams. By way of example, the concepts of the invention are applicable to high altitude platforms (HAPs) for wireless telecommunications. A HAP generally operates in a quasi-stationary position at altitudes of upwards of 22 kilometers (typically 17-22 km). Such a HAP will carry a communications payload somewhat akin to a satellite payload. HAPS, however, operate at much lower altitudes than satellites, making it possible to cover smaller regions more effectively, for example, via radio frequency communications beams. A HAP may also relay data communications via a satellite (e.g., a geostationary orbit satellite).

Figure 1A:
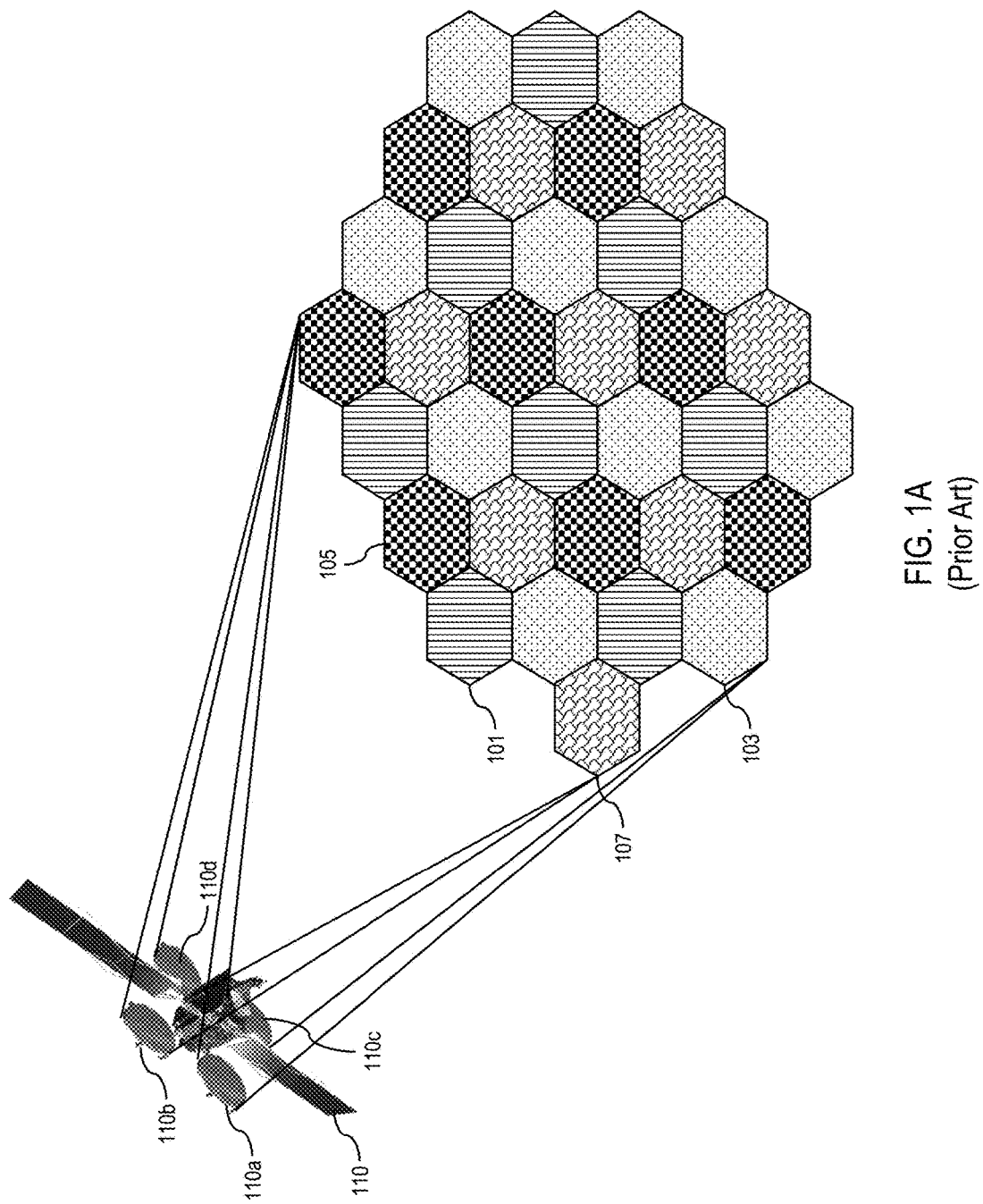
FIG. 1A illustrates a typical 4-beam (4-color) reuse cell pattern or plan for a satellite communications system.
Figure 1B:
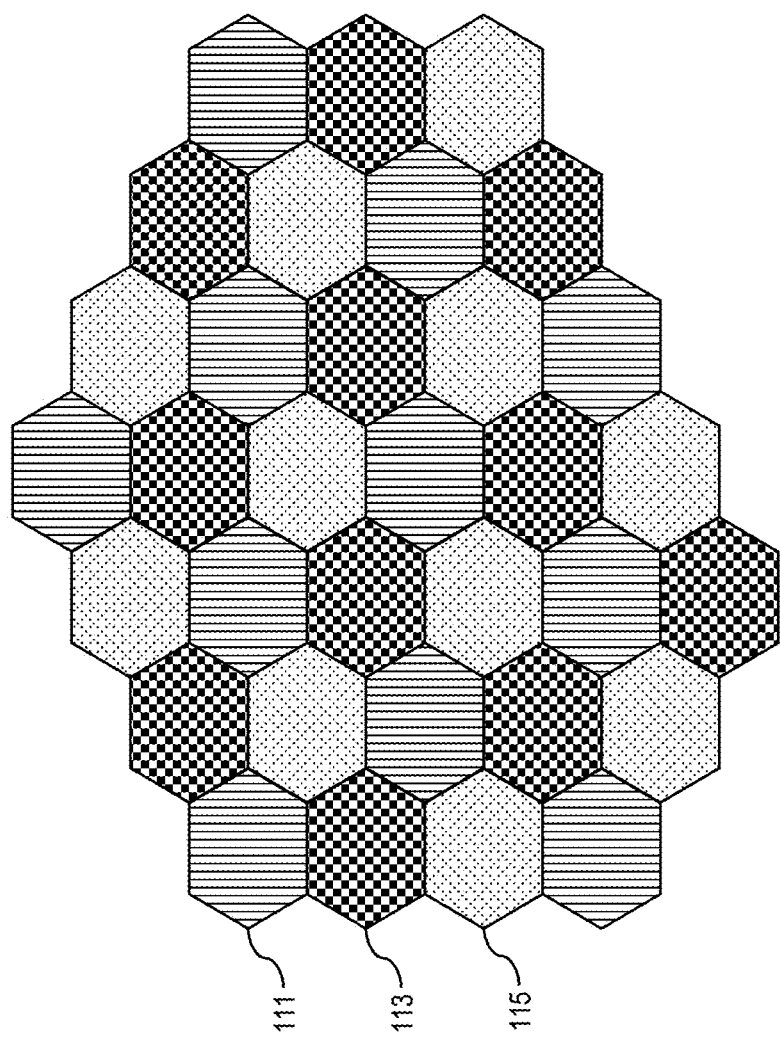
FIG. 1B illustrates a typical 3-beam (3-color) reuse cell pattern or plan for a satellite communications system.
Figure 1C:
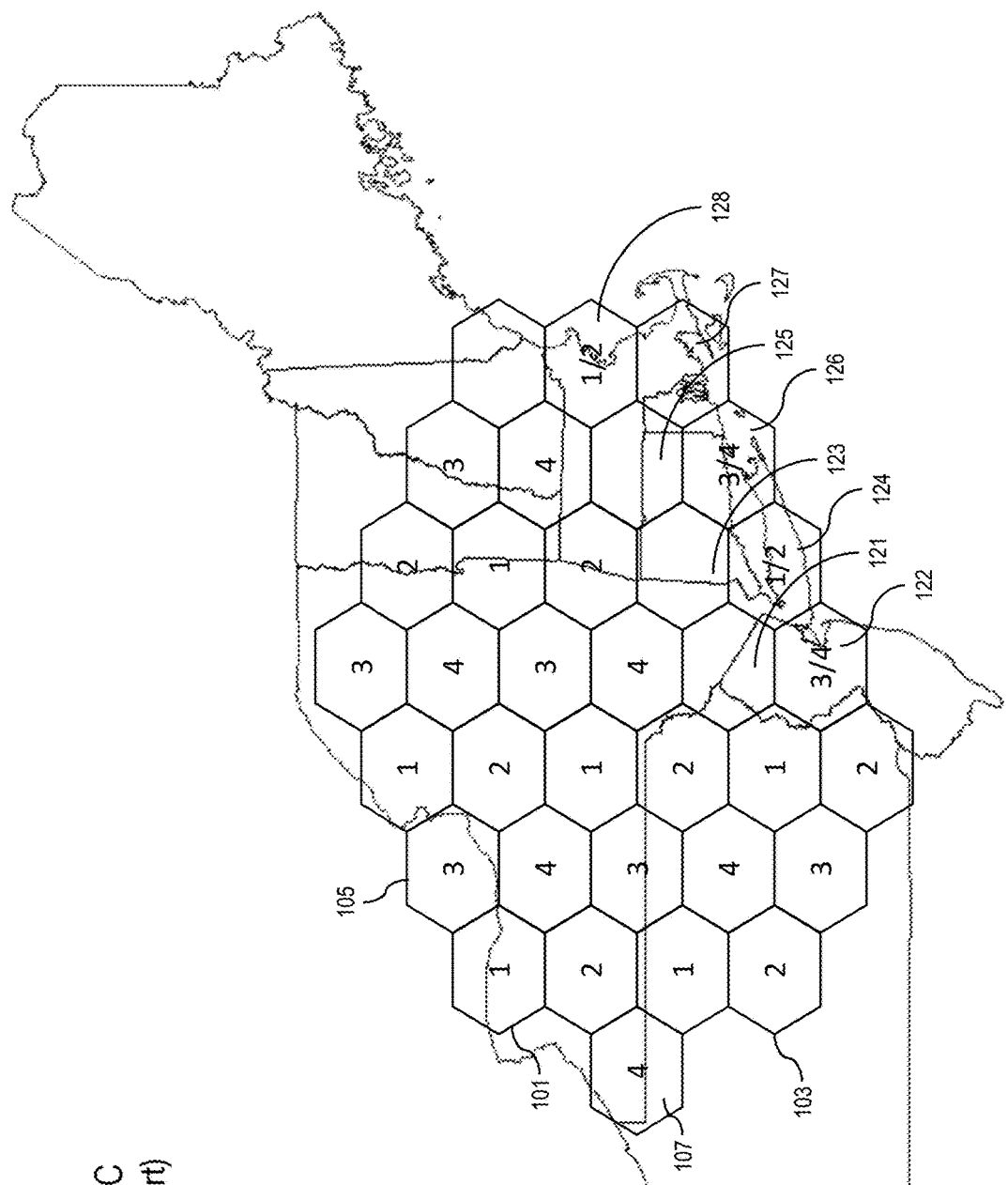
FIG. 1C illustrates the 4-beam (4-color) reuse plan of FIG. 1A, where the cell or beam pattern has been overlaid on a map of the Northeastern United States.
Figure 3A:
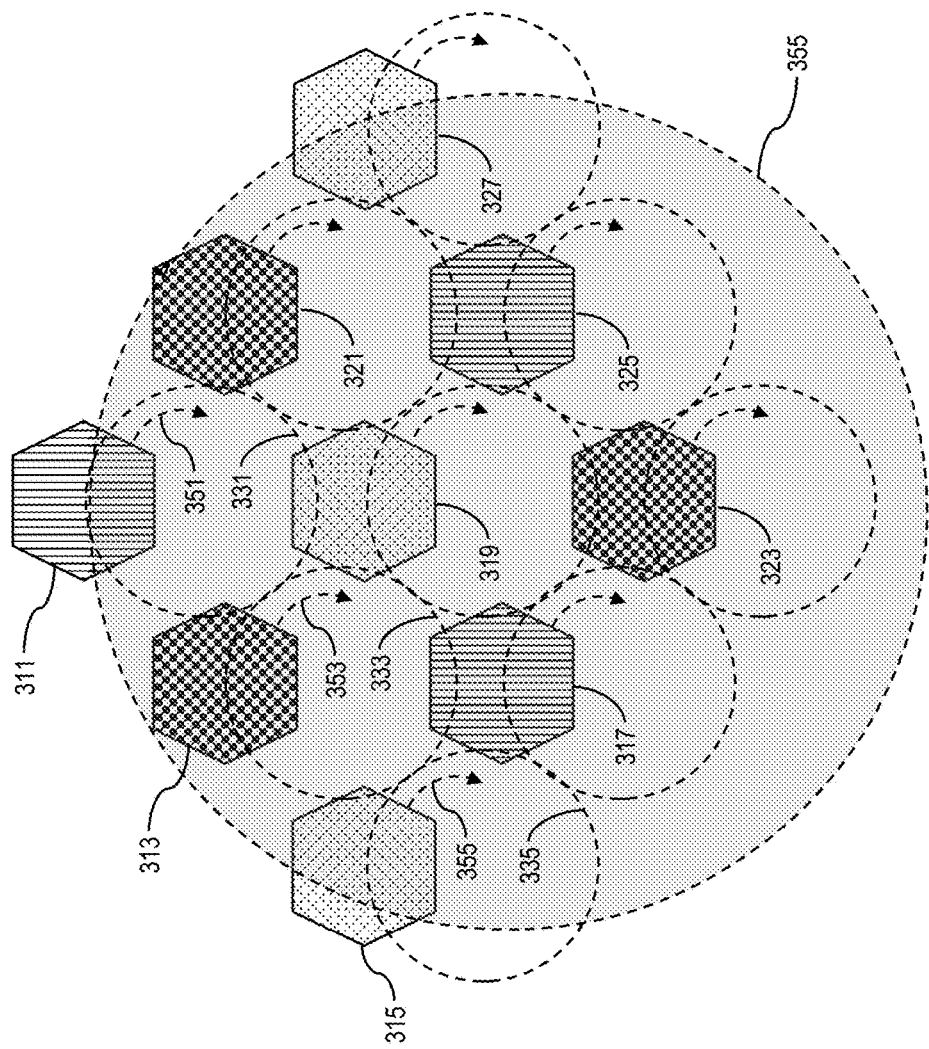
FIG. 3A illustrates the 3-beam (3-color) reuse cell pattern or plan of FIG. 1B with spot beams that move in a pattern about an origin, central point or other reference point to increase the coverage area of the beams, in accordance with example embodiments of the present invention.

FIG. 3A illustrates the 3-beam (3-color) reuse cell pattern or plan of FIG. 1B with spot beams that move in a pattern about an origin, central point or other reference point to achieve increased capacity over a respective geographical area, in accordance with example embodiments of the present invention. According to example embodiments, a satellite employs a set of small, isolated, high capacity beams and a mechanism, either mechanical or electrical, that causes the beams to nutate or move in a given pattern around their nominal position. The effect is to spread the capacity provided by each isolated beam over a larger area on the surface of the earth than that beam would have covered had it remained stationary. Effectively, the total capacity is not being increased, but rather the area covered by a given number of beams is being increased. According to alternative embodiments, the movement of the beams may encompass a gradual sweeping across or around the desired area, or beams that jump from one discrete position to another, or even just a single beam that sweeps across an area.

Figure 3B:
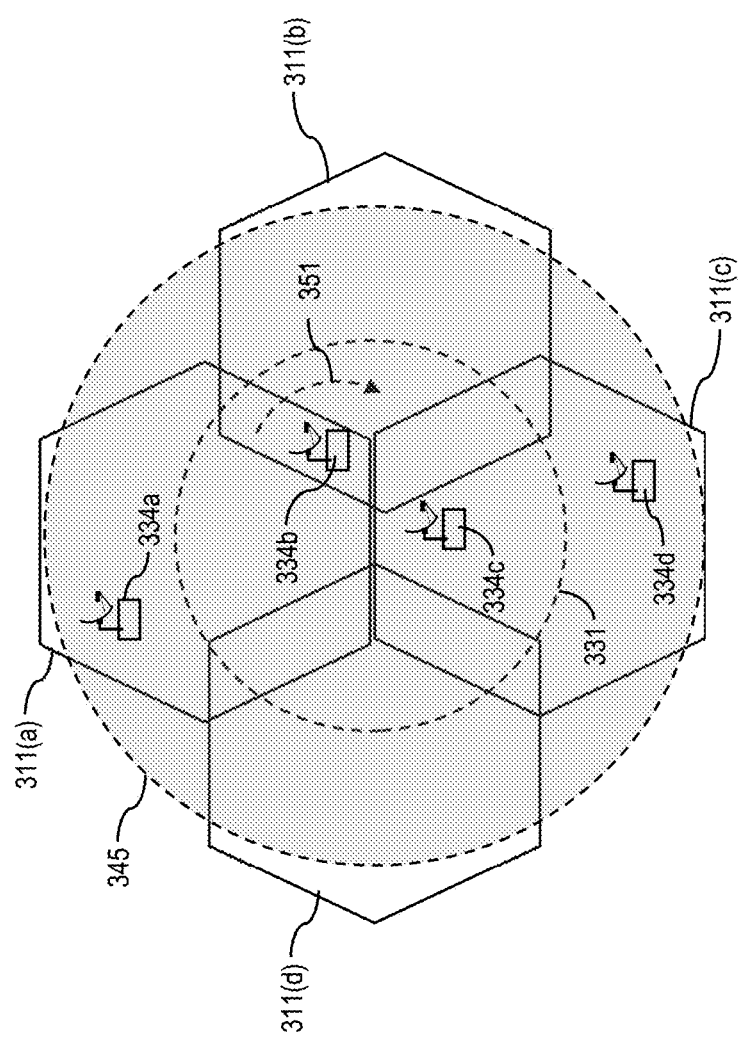
FIG. 3B illustrates an expanded view of the spot beam 311 of FIG. 3A as it travels through four positions of its pattern of movement, in accordance with example embodiments of the present invention.

As shown in the figure, each of the beams moves in a circular pattern. For example, the beam 311 (or spot beam) moves in the circular pattern shown by the dashed circle 331 in the direction shown by the dashed arrow 351, the beam 313 moves in the circular pattern shown by the dashed circle 333 in the direction shown by the dashed arrow 353, and the beam 315 moves in the circular pattern shown by the dashed circle 335 in the direction shown by the dashed arrow 355. FIG. 3B illustrates an expanded view of the beam 311 of FIG. 3A as it travels through four positions of its pattern of movement, in accordance with example embodiments of the present invention. The four positions are reflected by the beams 311(*a*), 311(*b*), 311(*c*), 311(*d*) (positions a, b, c, d). As can be seen from the figure, at any given point in time, the beam provides its full spectrum of bandwidth to a respective beam position around its pattern of movement where the beam is situated at that point in time. Accordingly, with a gradual progression of the beam through its pattern of movement, over the time period of one full path through the pattern of movement, the beam provides its full spectrum of bandwidth to a larger area covered by the pattern of movement—any location within that larger area is covered by the beam during some time period within the time period of one full path through the pattern of movement of the beam. For example, as depicted in FIG. 3B, over a complete progression through the circular path 331, the beam 311 effectively provides its full spectrum of bandwidth over the coverage area within the dashed circle 345—any location within the area 345 is covered by the beam 311 during some time period within the time period of one full path through the pattern of movement 331 of the beam. Similarly, as depicted in FIG. 3A, over a complete progression through the respective circular paths, the beams (or spot beams) 311-327 effectively each provides its full spectrum of bandwidth over the coverage area within the dashed circle 355—any location within the area 355 is covered by a beam during some time period within the time period of one full path through the pattern of movement of that beam. Further, depending on overlap, a location may be within the coverage area of multiple beams (a different beam during different time periods), where the location is within the coverage area of a given beam during a respective period of time within the time period of one full path through the pattern of movement of that beam (different beams may cover the same location at different respective points in time or time periods). Accordingly, as can be seen from FIG. 3A, by employing beams that move in a pattern about an origin, central point or other reference point in accordance with example embodiments of the present invention, the full spectrum of each beam can be provided over a given coverage area (e.g., the coverage area 355) with fewer beams than with fixed beams or spot beams (e.g., as depicted in FIG. 1B). Note, the beams and respective movement patterns shown in the various figures of the present application are not drawn to scale.

As further depicted in FIG. 3B, terminals 334a, 334b, 334c, 334d will be within the coverage area of the beam 311 at different points in time over the progression of the beam through its pattern of movement 331. For example, the terminal 334a is within the coverage area the beams 311 at least during the point in time that the beam is in the position (a). Similarly, the terminal 334d is within the coverage area the beams 311 at least during the point in time that the beam is in the position (c). The qualifier "at least" is used here to indicate that, depending on the trajectory of the pattern of movement of the beam 311, the terminal 334a will be in the coverage area of that beam for a period of time during which the beam progresses through various positions along its pattern of movement, but at some point the beam will move to a position where the terminal 334a is no longer within its coverage area. The same will be true for all the terminals within the overall coverage area 345. Accordingly, the full spectrum or capacity of a beam may not be available to each terminal for the entire period of time of the beam's progression through its pattern of movement. Further, based on the geometry of the particular movement pattern of a beam, and the size and shape of the beam itself, the duration that a terminal is within the coverage area a respective beam may vary depending on the location of the terminal within the overall coverage area of the beam over its complete pattern of movement.

According to different example embodiments, therefore, different patterns of movement of a beam may be implemented to achieve different respective concentrations of coverage/capacity of the beam for different specific sub-areas within the overall coverage area of the beam over its complete pattern of movement. By way of example, as pointed out above with the overlap of the circular patterns of FIG. 3A, the patterns of movement may be designed to overlap in such a way as to provide more capacity to a particular region, with coverage of that region by different beams during different time periods within the time period of one full path through the pattern of movement of the beams. By way of further example, the pattern of movement of a beam may be in the shape of an oval or ellipse. By way of further example, the pattern of movement of a beam may be in the shape of a figure-eight, or even a rotating figure-eight, whereby the beam would pass back and forth over a given sub-area within the overall coverage area of the beam over its complete pattern of movement. The pattern of movement of the beam may thereby be designed to provide more capacity within the central region and less capacity around outer regions of the overall coverage area—for example, providing increased capacity to the center of a concentrated urban area and less capacity around the suburbs of that concentrated urban area (e.g., higher capacity within a city and reduce capacity within the suburbs around that city).

According to further example embodiments, the rate of movement of the beams through their respective patterns of movement will affect the capacity distribution as a function of time. The rate of movement will control the amount of time each beam covers different regions within the overall coverage area of its pattern of movement. The slower the rate of movement of a beam, the more time the beam will cover respective regions within the overall coverage area, but that slower movement will increase the time that a respective region will not be within the coverage are of a beam (e.g., the time until the beam comes back around to cover the region again). The time periods that any given region is not within the coverage area of a beam, however, can also be controlled by the overlap of the patterns of different beams, whereby the region is covered by different beams at different points in their respective movement patterns. Further, according to certain example embodiments, the rate of movement may be reconfigurable depending on different factors, such as business plans for capacity allocations across a given geographical region, changes in network conditions over time (e.g., congestion conditions as network customer subscriptions increase, or different network loading conditions at different times of day or different days of the week or the year, different capacity realization in different regions due to weather and other such conditions, etc.). By way of example, the time period for a complete cycle through the respective pattern of movement for a beam generally may be on the order of milliseconds (e.g., 100 msec), however, some business plans may be able to tolerate longer cycle times (e.g., 1 second).

In accordance with example embodiments, the patterns of movement of the various beams of a satellite antenna may be predetermined and fixed in the design and implementation of the antenna (e.g., in the hardware and software of the satellite antenna and the respective antenna control mechanisms). Alternatively, to some degree, the patterns of movement of the various beams may be implemented as being configurable via software and ground control. As would be appreciated by one of ordinary skill in the art, however, there will be a trade-off between extent to which such patterns of movement are adaptable, or even the extent of the complexity of fixed patterns of movement, and the associated complexity of the hardware and software of the satellite antenna and the respective antenna control mechanisms (and the associated size, weight, power restrictions the overall satellite).

In further accordance with such example embodiments, in any case (e.g., in the case of fixed predetermined patterns of movement or configurable patterns of movement), between the NOC 242 and the gateways 238, the system will have knowledge of the path and position of each of the beams throughout their respective patterns of movement. By way of example, in the case of configurable patterns of movement, the NOC may control the configuration of the satellite and update the gateways regarding any changes in the configuration of the beam patterns. By way of further example, in the case of fixed patterns of movement, the gateways would be preprogrammed and synchronized with the patterns of movement of the beams. Each gateway (GW) 238 will thereby possess knowledge of the pattern of movement the beam or beams that provide coverage for the respective terminals associated with that gateway (or the IP gateways (IPGWs) 248 within that gateway). As such, each GW/IPGW will allocate bandwidth of a respective beam to each terminal based on the periods of time during which that terminal is within the coverage area of that beam. Further, for the transmission of data to a respective IPGW (the return or inroute direction), each terminal will synchronize with a beam during the time period that the terminal is within the coverage area of that beam, and will transmit its data during the time periods and within the time slots allocated to the terminal within that time period. For the receipt of data from a respective IPGW (the forward or outroute direction), each terminal will synchronize with a beam during the time period that the terminal is within the coverage area of that beam, and will receive data directed to that terminal during that time period. Also, from the perspective of the gateway and satellite, the gateway and satellite will have to synchronize their respective data transmissions so that data being transmitted to terminals within a particular region of the overall coverage are of a moving beam will be transmitted only when the beam is in a position covering that region. Such synchronization of forward or outroute gateway data transmissions may be accomplished by both the gateway and the satellite. For example, the gateway may be configured to transmit data destined for a particular region only during time periods when that region is expected to be within the coverage of a respective beam. Also, in the event that the satellite receives data from a gateway destined for a particular region and is unable to transmit that data while that region is within the coverage of a respective beam, the satellite may be configured to handle that situation in one of various different ways. One way would be to buffer the data until a time period when the destined region is within the coverage area of a respective beam, or alternative may be for the satellite to either drop the data or transmit the data anyway, in which case it will not be received by the destination terminals and may then be retransmitted by the gateway at a subsequent time when the destination region is within the coverage area of respective beam. By way of further example, depending on the rate of the movement of a beam, the respective terminals may be configured to address Doppler shift and other synchronization issues associated with the movement of the beam. By way of further example, for the timing of the transmission from the gateway to the satellite, and then on to the destination terminal, the system may measure the round-trip delay to the satellite using conventional means and determine the proper timing for such transmissions, and such timing measurements can be updated periodically to achieve more accurate synchronization over time (e.g., to accommodate changing network and other conditions, such as weather).

Figure 4A:
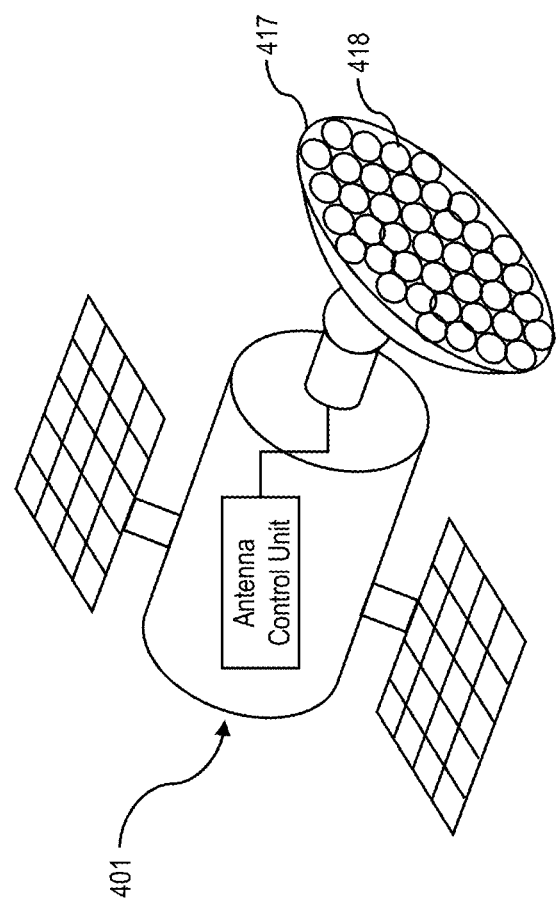
FIG. 4A illustrates a first example embodiment for a satellite that employs an antenna with spot beams that move in a pattern about an origin, central point or other reference point, in accordance with example embodiments of the present invention.

On the satellite, the pattern of movement of the beams in accordance with example embodiments of the present invention can be achieved by any of various different approaches. FIG. 4A illustrates a first example embodiment for a satellite that employs an antenna with beams that move in a pattern about an origin, central point or other reference point, in accordance with example embodiments of the present invention. In the embodiment of FIG. 4A, the beam formation and beam movement is achieved via implementation of the antenna 417 of the satellite 401 as a phased array antenna. A phased array antenna typically comprises an array of individual radiating elements 418 that are electronically scanned to create a beam of radio waves. In a phased array antenna, the radio frequency transmission signals are fed from the transmitter to the individual antenna elements with phase relationships that result in the radio waves from the individual elements adding together to increase the radiation in a desired direction, and also cancelling to suppress radiation in undesired directions. The power from the transmitter is fed to the antenna elements via phase shifters that can be controlled by a computer or beam-forming processor to alter the phase electronically and thereby steer the array beams in different directions over time. Accordingly, the individual beams generated by the phased array can be steered to move through the desired respective patterns of movement. By way of example, in discrete instances of time, the beams of the array may be shifted to a next respective position in the desired pattern, thereby creating a stepped sequence of beam movement through the deaired pattern. The duration that each beam spends at a given position can be configured to control the capacity delivery throughout the sequence of positions of the pattern of movement, and to control the overall cycle time for a complete progression through the pattern.

Figure 4B:
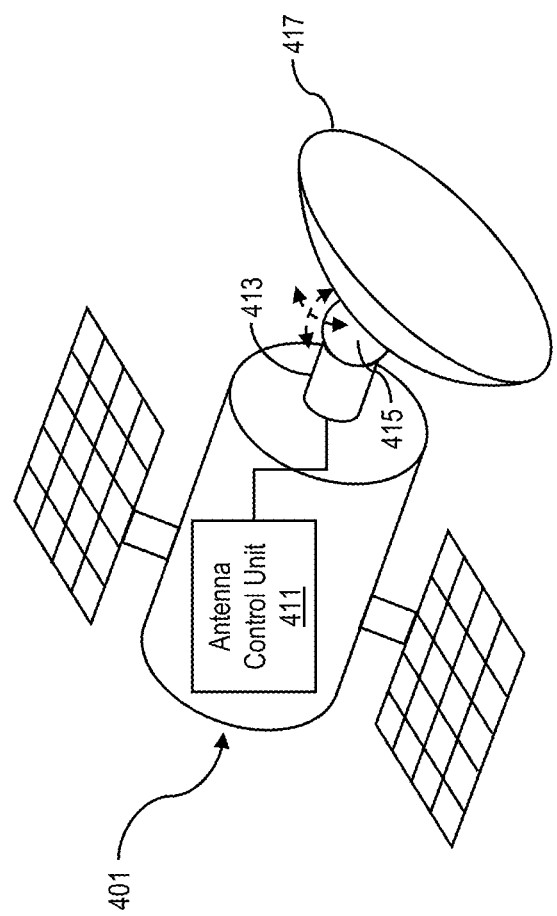
FIG. 4B illustrates a second example embodiment for a satellite that employs an antenna with spot beams that move in a pattern about an origin, central point or other reference point, in accordance with example embodiments of the present invention.

FIG. 4B illustrates a second example embodiment for a satellite that employs an antenna with beams that move in a pattern about an origin, central point or other reference point, in accordance with example embodiments of the present invention. The satellite 401 comprises an antenna control unit (ACU) 411, an antenna 417, an antenna mount 415, an antenna positioning mechanism 413 and an antenna control unit. The antenna positioning mechanism may comprise one or more motorized devices (or other devices capable of controlling movement of an object secured to the device) coupled to the antenna mount 415. The antenna mount is configured to facilitate movement of the antenna in multiple directions (e.g., as indicated by the dashed arrow lines 421). The ACU 411 may comprise a processor or other control element (e.g., an application specific integrated circuit (ASIC), a field programmable gate array (FPGA) or other control device) configured to control the antenna positioning mechanism 413 to move the antenna about the antenna mount 415. The ACU may thereby control the movement of the antenna 417 to move the beams in their respective patterns of movement (e.g., the circular patterns of movement depicted in FIG. 3A).

Figure 4C:
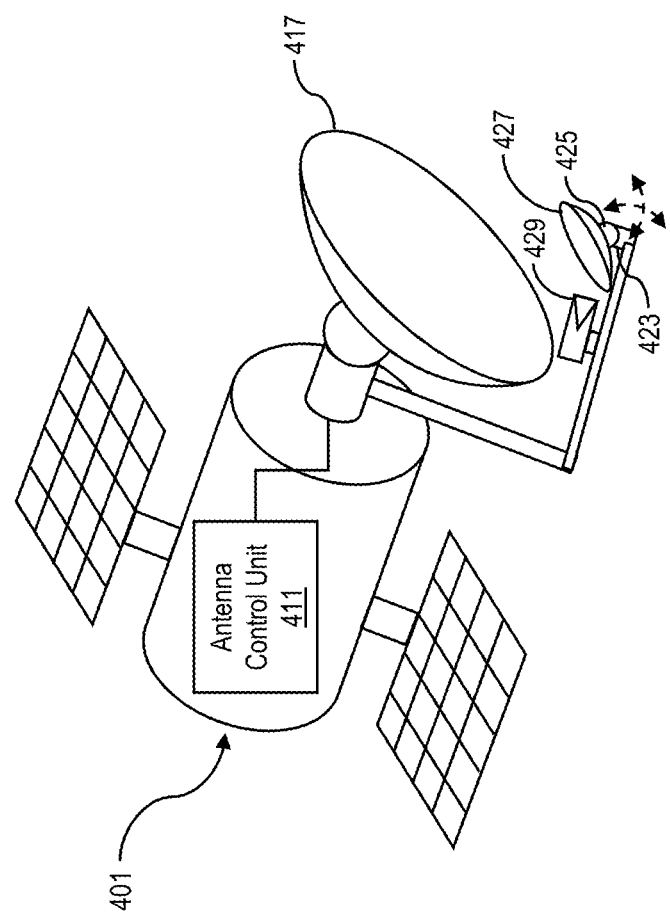
FIG. 4C illustrates a third example embodiment for a satellite that employs an antenna with spot beams that move in a pattern about an origin, central point or other reference point, in accordance with example embodiments of the present invention.

FIG. 4C illustrates a third example embodiment for a satellite that employs an antenna with beams that move in a pattern about an origin, central point or other reference point, in accordance with example embodiments of the present invention. The antenna of the satellite of FIG. 4C comprises the feed 429 that illuminates the beams, and a subreflector 427, where the subreflector 427 is mounted via an antenna positioning mechanism 423 and an antenna mount 425. Similar to the movement of the antenna 417 in the embodiment of FIG. 4B, in this embodiment, the ACU controls the movement of the antenna subreflector 427 to move the beams in their respective patterns of movement. According to an alternative embodiment for the movement of the subreflector, the subreflector 427 may be configured as a disc with different shaped surfaces or facets at different regions of the subreflector surface, where the different facets direct the primary beam radiation pattern to different parts of the main reflector. The subreflector would further be mounted in a manner whereby the antenna positioning mechanism 423 could spin the subreflector about an axis effectively perpendicular to the surface of the subreflector, such that as the different facets of the subreflector line up with the feed, the beam positions move according to the pointing of that facet. In this manner, the different shaped surface regions or facets of the subreflector could be configured to move the beams in their respective patterns of movement as the subreflector spins about its axis of rotation. With this configuration, however, the beam movement might not be a steady or continuous movement, but rather may be a stepped movement whereby a beam is pointing to a respective location for each individual shaped surface region of the subreflector. Alternatively, a diffraction prism (at RF frequencies) can be employed, where the prism is rotated to direct the primary beam radiation pattern to different parts of the main reflector.

Figure 4D:
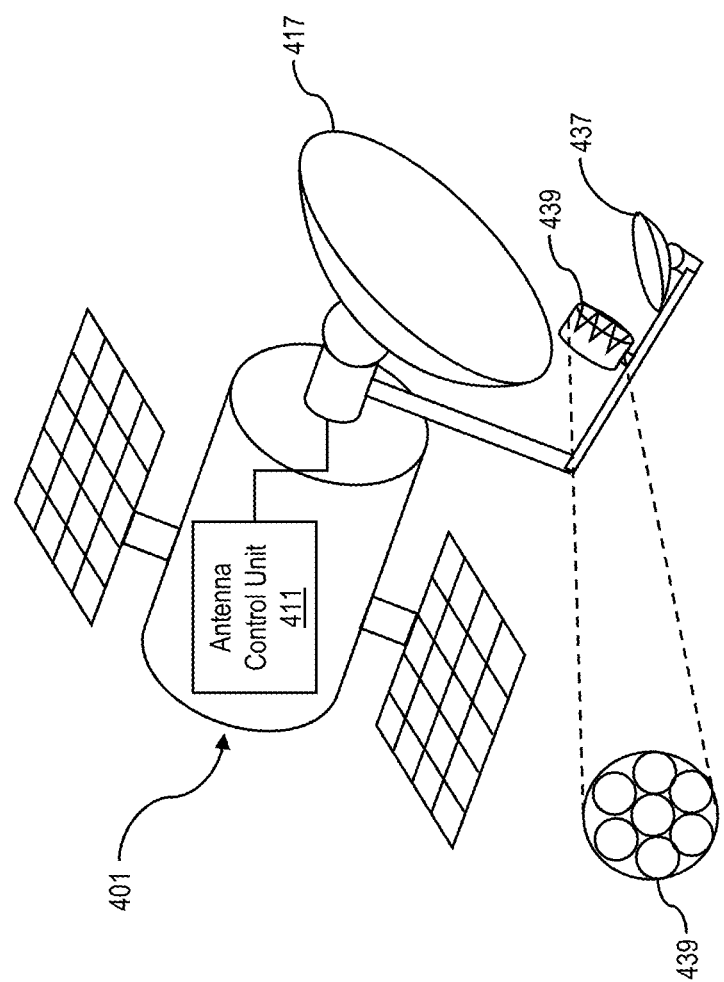
FIG. 4D illustrates a fourth example embodiment for a satellite that employs an antenna with spot beams that move in a pattern about an origin, central point or other reference point, in accordance with example embodiments of the present invention.

FIG. 4D illustrates a fourth example embodiment for a satellite that employs an antenna with beams that move in a pattern about an origin, central point or other reference point, in accordance with example embodiments of the present invention. In the embodiment of FIG. 4D, the antenna 417 comprises the fixed subreflector 437 (although the subreflector may still be movable in order to account for pointing corrections required due to satellite attitude changes or other pointing errors), and a feed array 439 for illuminating the beams (a front view of the feed array 439 is depicted in the blown-up view indicated by the dashed lines in the figure). With this configuration, the beam movement can be achieved by illuminating different elements of the feed array to position the resulting beam at different respective locations depending on the particular element illuminated.

According to further example embodiments, the beam formation and movement may be achieved via a beam-forming network that allows a single stream of data to hop among several beam positions. A fixed beamforming network (e.g., a ground-based beam-forming network) may be employed, which may be fed from multiple uplink channels, and the respective beams positions can be determined by ground control.

Figure 5:
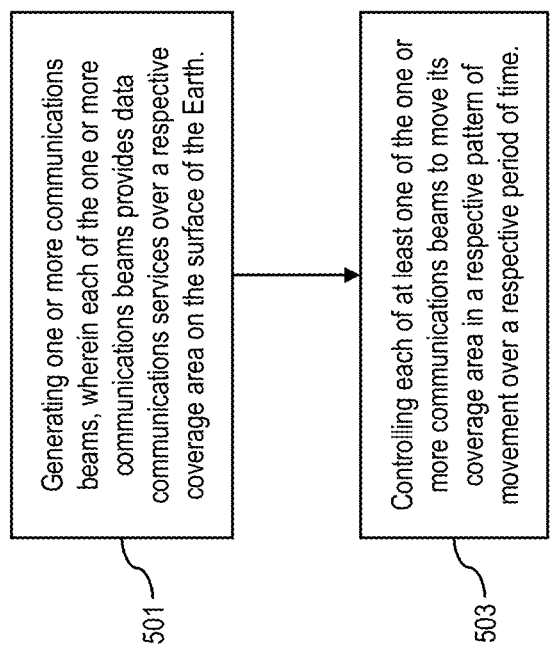
FIG. 5 illustrates a flow chart depicting a process for implementing communications spot beams that move in a pattern to increase the coverage area of the beams, in accordance with example embodiments of the present invention.

FIG. 5 illustrates a flow chart depicting a process for implementing communications spot beams that move in a pattern to increase the coverage area of the beams, in accordance with example embodiments of the present invention. In step 501, a wireless telecommunications apparatus generates one or more communications beams, wherein each of the one or more communications beams provides data communications services over a respective coverage area on the surface of the Earth. In step 503, each of at least one of the one or more communications beams is controlled to move its coverage area in a respective pattern of movement over a respective period of time.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A wireless telecommunications apparatus comprising:
an antenna configured to generate one or more communications beams, wherein each communications beam is configured to provide a respective bandwidth for wireless data communications over a respective coverage area on the surface of the Earth to which the beam is pointed at any given point in time; and
one or more processors configured to control a pointing direction of each of at least one of the one or more communications beams to move in a pattern relative to a respective reference point in a manner whereby the coverage area of the beam on the surface of the Earth moves through a respective pattern of movement over a respective period of time to spread the respective bandwidth of the beam over a larger coverage area during the respective period of time relative to the respective coverage area of the beam at a specific point in time.

2. The wireless telecommunications apparatus according to claim 1, wherein each of the at least one of the communications beams that is controlled to move is configured to provide, at any given point in time, a full available spectrum of bandwidth of the beam to a respective coverage area, within the beam's respective pattern of movement, to which the beam is pointing at the given point in time.

3. The wireless telecommunications apparatus according to claim 1, wherein the respective pattern of movement of each of the at least one of the communications beams that is controlled to move is one of a circular pattern, an oval pattern and an elliptical pattern.

4. The wireless telecommunications apparatus according to claim 1, wherein a plurality of the communications beams are controlled to move, and the respective patterns of movement of the communications beams that are controlled to move are configured to overlap to provide more capacity to a particular region on the Earth's surface, with coverage of that region by different beams during different time periods within the time period of a one full path through the pattern of movement of the beams.

5. The wireless telecommunications apparatus according to claim 1, wherein a rate of movement through the respective pattern of movement for each of the at least one of the communications beams that is controlled to move is configurable to enable variance of a capacity distribution of bandwidth provided by the beam as a function of time.

6. The wireless telecommunications apparatus according to claim 1, wherein the antenna is a phased array antenna, and at least one of the one or more processors is configured to control the generation and movement of each of the at least one of the communications beams that is controlled to move by controlling beam steering via a phased array of the antenna.

7. The wireless telecommunications apparatus according to claim 1, wherein the antenna includes a mechanically steerable main reflector, and at least one of the one or more processors is configured to control the movement of each of the at least one of the communications beams that is controlled to move by controlling mechanical movement of the main reflector of the antenna.

8. The wireless telecommunications apparatus according to claim 1, wherein the antenna includes a mechanically steerable sub-reflector, and at least one of the one or more processors is configured to control the movement of each of the at least one of the communications beams that is controlled to move by controlling mechanical movement of the sub-reflector of the antenna.

9. The wireless telecommunications apparatus according to claim 1, wherein the antenna includes a feed array that is configured to generate the one or more communications beams by illuminating a fixed sub-reflector, and at least one of the one or more processors is configured to control the movement of each of the at least one of the communications beams that is controlled to move by controlling illumination of different elements of the feed array of the antenna to position the beam via the fixed sub-reflector.

10. The wireless telecommunications apparatus according to claim 1, wherein the movement of each of the at least one of the communications beams that is controlled to move is performed by a beam-forming network that allows a single stream of data to hop among several beam positions.

11. A method comprising:
generating, via an antenna of a wireless telecommunications apparatus, one or more communications beams, wherein each of the one or more communications beams is configured to provide a respective bandwidth for wireless data communications over a respective coverage area on the surface of the Earth to which the beam is pointed at any given point in time; and controlling, via at least one processor of the wireless telecommunications apparatus, a pointing direction of each of at least one of the one or more communications beams to move in a pattern relative to a respective reference point in a manner whereby the coverage area of the beam on the surface of the Earth moves through a respective pattern of movement over a respective period of time to spread the respective bandwidth of the beam over a larger coverage area during the respective period of time relative to the respective coverage area of the beam at a specific point in time.

12. The method according to claim 11, wherein each of the at least one of the communications beams that is controlled to move is configured to provide, at any given point in time, a full available spectrum of bandwidth of the beam to a respective coverage area, within the beam's respective pattern of movement, to which the beam is pointing at the given point in time.

13. The method according to claim 11, wherein the respective pattern of movement of each of the at least one of the communications beams that is controlled to move is one of a circular pattern, an oval pattern and an elliptical pattern.

14. The method according to claim 11, wherein a plurality of the communications beams are controlled to move, and the respective patterns of movement of the communications beams that are controlled to move are configured to overlap to provide more capacity to a particular region on the Earth's surface, with coverage of that region by different beams during different time periods within the time period of a one full path through the pattern of movement of the beams.

15. The method according to claim 11, wherein a rate of movement through the respective pattern of movement for each of the at least one of the communications beams that is controlled to move is configurable to enable variance of a capacity distribution of bandwidth provided by the beam as a function of time.

16. The method according to claim 11, wherein the generation and movement of each of the at least one of the communications beams that is controlled to move is performed by beam formation and steering via a phased array of the antenna of the wireless telecommunications apparatus.

17. The method according to claim 11, wherein the movement of each of the at least one of the communications beams that is controlled to move is performed by mechanical movement of a main reflector of the antenna of the wireless telecommunications apparatus.

18. The method according to claim 11, wherein the movement of each of the at least one of the communications beams that is controlled to move is performed by mechanical movement of a sub-reflector of the antenna of the wireless telecommunications apparatus.

19. The method according to claim 11, wherein the movement of each of the at least one of the communications beams that is controlled to move is performed by illuminating different elements of a feed array to position the beam via a fixed sub-reflector of the antenna of the wireless telecommunications apparatus.

20. The method according to claim 11, wherein the movement of each of the at least one of the communications beams that is controlled to move is performed by via a beam-forming network that allows a single stream of data to hop among several beam positions.

* * * * *